(12) United States Patent
Parker

(10) Patent No.: US 11,506,562 B2
(45) Date of Patent: Nov. 22, 2022

(54) MONITORING OF FLUID PIPES

(71) Applicant: CRALEY GROUP LIMITED, Farnborough (GB)

(72) Inventor: Michael Parker, Camberley (GB)

(73) Assignee: CRALEY GROUP LIMITED, Farnborough (GB)

(*) Notice: Subject to any disclaimer, the term of this patent is extended or adjusted under 35 U.S.C. 154(b) by 60 days.

(21) Appl. No.: 16/976,332

(22) PCT Filed: Feb. 28, 2019

(86) PCT No.: PCT/GB2019/050555
§ 371 (c)(1),
(2) Date: Aug. 27, 2020

(87) PCT Pub. No.: WO2019/166809
PCT Pub. Date: Sep. 6, 2019

(65) Prior Publication Data
US 2021/0140845 A1    May 13, 2021

(30) Foreign Application Priority Data

Feb. 28, 2018 (GB) .................................. 1803294

(51) Int. Cl.
*G01M 3/24* (2006.01)
*G01M 3/38* (2006.01)

(52) U.S. Cl.
CPC .................. *G01M 3/243* (2013.01)

(58) Field of Classification Search
CPC ............ G01M 3/00; G01M 3/18; G01M 3/24; G01M 3/243; G01M 3/38
See application file for complete search history.

(56) References Cited

U.S. PATENT DOCUMENTS

| 4,747,309 A | 5/1988 | Weir |
| 6,004,639 A * | 12/1999 | Quigley ................. F16L 9/147 |
| | | 428/36.3 |

(Continued)

FOREIGN PATENT DOCUMENTS

| CA | 2790209 A1 * | 8/2011 | ........... G01B 11/161 |
| GB | 2443832 A | 5/2008 | |

(Continued)

OTHER PUBLICATIONS

Examination Report under Section 18(3) received in Great Britain Application No. GB1803294.6 dated Apr. 3, 2019, 5 Pages.

(Continued)

*Primary Examiner* — Nguyen Q. Ha
(74) *Attorney, Agent, or Firm* — Adler Pollock & Sheehan P.C

(57) ABSTRACT

A fluid pipe 1 is monitored using a distributed acoustic sensing (DAS) fibre 10 provided within pipe 1. The DAS fibre 10 is coupled at one end to a light emitter 101 and a light detector 102. The light emitter 101 emits light pulses into the DAS fibre. The light detector 102 detects backscattered light so as to provide an indication of the vibration experienced by each section of the DAS fibre 10 and thus of vibration characteristic of particular pipe events including leaks of the pipe 1. The DAS fibre 10 in a pipe 1 can also be used to locate the route of a buried pipe 1 by successively tamping the ground surface at a number of locations A-E in the vicinity of the suspected route of the pipe 1 and comparing the tamping vibrations detected from each location A-E.

34 Claims, 8 Drawing Sheets

(56) References Cited

U.S. PATENT DOCUMENTS

| | | |
|---|---|---|
| 8,098,063 B2 | 1/2012 | Paulson |
| 9,500,554 B2 * | 11/2016 | Kulkarni ................ G01M 3/002 |
| 9,939,341 B2 * | 4/2018 | McNab ................... G01M 3/38 |
| 2011/0007996 A1 | 1/2011 | Huffman |
| 2011/0069302 A1 | 3/2011 | Hill et al. |
| 2012/0092960 A1 | 4/2012 | Gaston et al. |
| 2013/0319121 A1 | 12/2013 | Hill et al. |
| 2013/0333474 A1 | 12/2013 | Godfrey et al. |
| 2015/0098673 A1 | 4/2015 | Barfoot et al. |
| 2015/0355107 A1 | 12/2015 | Paulson |
| 2017/0039826 A1 | 2/2017 | Cojocaur |
| 2017/0076563 A1 | 3/2017 | Guerriero et al. |

FOREIGN PATENT DOCUMENTS

| | | |
|---|---|---|
| WO | 2004081509 A1 | 9/2004 |
| WO | 2008017276 A1 | 2/2008 |
| WO | 2010034988 A1 | 4/2010 |
| WO | 2013185810 A1 | 12/2013 |
| WO | 2016174410 A1 | 11/2016 |
| WO | 2017021702 A1 | 2/2017 |
| WO | 2017147679 A1 | 9/2017 |

OTHER PUBLICATIONS

International Search Report and Written Opinion received in International Application No. PCT/GB2019/050555 dated Jul. 29, 2019, 15 pages.

Invitation to Pay Additional Fee received in International Application No. PCT/GB2019/050555 mailed on Jun. 7, 2019, 11 Pages.

\* cited by examiner

MONITORING OF FLUID PIPES

CROSS-REFERENCE TO RELATED APPLICATIONS

This present application claims priority as a national stage application submitted under 35 U.S.C. 371 from PCT/GB2019/050555 filed Feb. 28, 2019, which claims priority to patent application number GB 1803294.6, filed Feb. 28, 2018, the entire contents of each are hereby incorporated by reference herein.

TECHNICAL FIELD OF THE INVENTION

The present invention relates to improvements in or relating to the monitoring of fluid pipes. In particular, the present invention relates to techniques for monitoring fluid pipes, methods of installing sensing apparatus and uses of sensing apparatus for monitoring the condition of pipes. Additionally, the present invention may further relate to the monitoring of activity adjacent to pipes and/or methods for locating pipes buried underground.

BACKGROUND TO THE INVENTION

Many modern services rely upon a network of pipes to carry or distribute fluids. Examples include fresh water, waste water and sewage, and fuels such as oil or gas. It is common to monitor the operation of the network and the condition of pipes. In this manner, blockages, leaks or other issues can be identified and scheduled for repair.

Where pipes are provided above ground, monitoring may be achieved by visual inspection of the pipe exterior. In many cases, pipes are not accessible to visual inspection, being buried underground. Accordingly, pressure/audio sensors or the like may be utilised to detect vibrations of the pipe and thereby provide information on conditions within a pipe.

If a pipe operator has sufficient budget, pressure/audio sensors can be permanently fitted periodically along the pipe, the sensor spacing being determined by a combination of sensitivity, expense and convenience. Typically, for convenience, these sensors might be located adjacent to pipe access points such as valve, junction or pump spaces. This has the benefit of enabling sensor signals to be readily relayed away from the pipe and for enabling ready access to fit and check the operation of such sensors. Arrangements of this type are able to provide an indication that there is a problem, for instance a leak. However sensors are widely spaced and it can therefore be difficult to identify a problem. Additionally, where it is possible to identify a problem it may be difficult to identify the location of the problem more precisely than between two fixed sensors or an approximate distance along the pipe from a sensor location. For instance, in water pipes existing sporadically located pressure/audio sensors might only be able to define the location of a problem with very poor locational accuracy or certainty.

In addition to or in place of permanently fixed sensors, it is possible to monitor the condition of a pipe by using a drone or the like introduced into the pipe. The submersible is fitted with one or more sensors and moves along a length of pipe between suitable access points. Accordingly, such a method is only applicable where the pipe does have access points suitable for introducing a submersible into the pipe. The submersible may move along the pipe under its own power or in response to the fluid flow within the pipe. Since the submersible is moving within the pipe, flow noise associated with this movement or noise associated with powering the submersible may mask sensing of relatively minor problems. Specifically a submersible is only able to define the location of a problem if it occurs when the submersible is actually passing by the event, the detection is transitory and such that it is not distributed or real-time.

Assuming either monitoring arrangement above can determine the location of a leak relative to a sensor location or access point, the pipe will still need to be accessed at that location to be repaired. Where pipes are buried underground this may still present a significant challenge. For instance, when considering water supply pipes in rural areas, whilst the location of valve chambers are typically well catalogued, the precise route that the pipe takes between these points may not be recorded. Accordingly, if a leak is suspected at a distance of 500 m from a valve, a repair team may seek to find the pipe by digging a pilot hole 500 m from the valve along the suspected route of the pipe. If such a hole does not locate the pipe, a series of additional exploratory holes within a wide arc must be dug until the pipe is located. This technique is known as 'pot-holing' and can be highly time-consuming, costly and disruptive. In the event that the pipe takes a meandering route and/or where the location of the leak along the pipe known only to a few tens or hundreds of meters, it may still be necessary to dig further holes to access the actual leak location. Such difficulties add considerably to the expense of pipe repair. In some instances, they may lead to decisions being taken to tolerate minor leaks for some time rather than attempt repairs immediately, and, leaks particularly in metal pipes (such as corrosion holes) may deteriorate very rapidly without corrective action In view of the above issues, distributed acoustic sensing (DAS) has been used for monitoring pipes. DAS involves the detection of backscattering of light pulses introduced into an optical fibre. The time of arrival and intensity of the backscattered light is measured for each pulse, the time at which the backscattered light is detected being related to the distance along the fibre the light has travelled before being scattered. Subsequent changes in the reflected intensity of successive pulses from a common region of the fibre correspond to variations in the strain applied to the fibre at that region, for instance due to vibrations experienced by the region of fibre. In this manner, the DAS fibre can act as a plurality of virtual microphones along the length of the fibre and can locate events causing acoustic signals down to an accuracy of around 1 meter.

DAS has been applied to above ground pipes (and alongside buried pipes when installed at the time of constructing the pipe) by affixing fibres directly to the exterior of such pipes. This provides good acoustic coupling between the fibres, the pipe and the fluids within the pipe. For above ground pipes it also enables ready installation and ready access for maintenance. Nevertheless, such exterior fibres are exposed both to accidental damage and to intentional damage.

As accessing the exterior of an existing buried pipe is difficult DAS has been applied to buried pipes by burying a DAS fibre in close proximity (typically 20-30 cm) to the pipe. Even so, works required for burying a DAS fibre can be expensive and highly disruptive, particularly where the buried pipe runs through an urban area. Additionally, separately buried DAS fibres suffer from limitations in sensitivity, particularly where ground conditions provide poor or highly variable acoustic coupling to the pipe. Furthermore, such separately buried DAS fibres are still susceptible to damage.

It is an object of the present invention to provide methods and apparatus which at least partially overcome or alleviate at least some of the above problems.

SUMMARY OF THE INVENTION

According to a first aspect of the present invention there is provided a method of monitoring a fluid pipe, the method comprising the steps of: providing a distributed acoustic sensing (DAS) fibre within the pipe; introducing coherent light pulses into the fibre; detecting backscattered light from the fibre; and processing the backscattered light so as to obtain information about the condition of the pipe.

According to a second aspect of the present invention, there is provided an apparatus for monitoring a pipe, the apparatus comprising: a distributed acoustic sensing (DAS) fibre provided within the pipe; a light emitter for introducing light pulses into the fibre; and a light detector for detecting backscattering of the said light pulses.

By providing a DAS fibre within a pipe, good acoustic coupling between the DAS fibre and the pipe is assured. Accordingly, DAS fibre can be used to detect pipe condition information including pressure waves, temperature changes, flow noise, orifice noise or the like. Where location or sensitivity permits, the DAS fibre may also detect and monitor vibrations from sources outside the pipe such as nearby traffic. Furthermore, a fibre within the pipe is more resistant to accidental damage or intentional damage than an external fibre. Additionally, introducing a fibre within an existing buried pipe can be less disruptive and less expensive than burying a DAS fibre in close proximity to the pipe.

The pipe may be a pipe carrying any suitable fluid. In particular, suitable fluids might include but are not limited to: water, waste water, sewage, and fuel such as oil, gas, distillates or the like and chemical or mining products.

The DAS fibre may be a single fibre. The DAS fibre may be a dedicated fibre within a bundle of fibres. The bundle of fibres may form a multicore fibre cable. The DAS monitoring preferably operates from one end only. As such the DAS fibre may be a single ended fibre.

Preferably a barrier is provided between the DAS fibre and the fluid. This can protect the DAS fibre from damage from the fluid or debris within the fluid. The barrier may comprise a coating or cover provided over the DAS fibre. In the event that the DAS fibre is provided within a multicore fibre, the barrier may comprise a coating or cover provided over the multicore fibre. Additionally or alternatively, the barrier may comprise a microduct within which the fibre is provided. In such embodiments, the method may include the step of introducing the microduct to the pipe and subsequently blowing the DAS fibre along the microduct.

In the event that there is a gap between the DAS fibre and the barrier, the gap may be filled with gel. This can improve acoustic coupling between the DAS fibre and the pipe or fluid within the pipe. The method may include the step of introducing a gel between the DAS fibre and the barrier.

The method may include the step of installing the DAS fibre in the pipe. The fibre may be installed temporarily. In such instances the method may include the step of removing the DAS fibre from the pipe after use.

Introducing the DAS fibre may include the steps of forming an aperture in the pipe wall and introducing a DAS fibre through the aperture. The DAS fibre can then be run along the interior of the pipe to a desired end point or to a desired exit point. Similarly, where the fibre is required to exit the pipe, the method may include the steps of forming an aperture through the pipe wall and removing the DAS fibre from the pipe.

The aperture may be provided with a fitting operable to provide a seal between the DAS fibre and the edges of the aperture. The fitting may be adapted to enable the formation of an aperture.

The method may comprise the steps of depressurising the fluid pipe before forming the aperture and installing a leak tight coupling around the fibre at each aperture. In other embodiments, the aperture may be formed and the DAS fibre introduced without depressurising the pipe. Numerous such 'hot tap' techniques are known in the art.

The DAS fibre may be transported along the interior of the pipe by the fluid flow within the pipe. This transport may be aided by the provision of a sail structure may be attached to the DAS fibre. The sail structure may be collapsible. This facilitates introduction/removal through the aperture and withdrawal of the DAS fibre against the fluid flow. Additionally or alternatively, the DAS fibre may be transported along the pipe by means of a powered submersible within the pipe.

In embodiments where the DAS fibre runs within a microduct, the microduct may be introduced to the pipe, and where appropriate, exit the pipe using the techniques described above in relation to the fibre. The DAS fibre may then be blown along the microduct.

The DAS fibre may run at any suitable position within the cross-section of the pipe. In some embodiments, the DAS fibre runs within the fluid separated from the pipe walls. The DAS fibre may have a neutral buoyancy. This helps to retain a position separated from the pipe walls.

In other embodiments, the DAS fibre may lie alongside a pipe wall. This may be achieved by the DAS fibre having a positive buoyancy or negative buoyancy as appropriate. Alternatively the DAS fibre may be secured to the pipe walls. In some such embodiments, the DAS fibre may be secured to the sides or top of the pipe. In other such embodiments, the DAS fibre may be secured to the base of the pipe. This location may be particularly suitable for pipes that do not carry a full fluid load at all times, for example gravity flow systems, as this ensures that the DAS cable is immersed in the fluid and can thus monitor the fluid flow.

In some embodiments, the DAS fibre may run within a microduct integrally formed within a pipe liner. In such embodiments, the method may include the additional steps of installing a pipe liner incorporating an integral microduct. In such embodiments, the method may include the additional steps of blowing DAS fibre along the integrated microduct. In such embodiments, where a particular buoyancy is required the microduct and DAS fibre combination are adapted to provide the required buoyancy.

A pipe liner with an integral microduct may comprise an elongate duct formed from multiple laminated layers of thermoplastic material, where heating means are provided within the pipe liner, the liner adapted to provide a cable duct between two laminate layers and wherein the cable duct is formed from a thermoplastic material having a higher transition temperature than the thermoplastic material forming the laminate layers. Such a pipe liner may be installed by the method of inserting the pipe liner into the pipe; heating the pipe liner; and subsequently pressing the pipe liner against the interior surface of the pipe. Such a liner and method of installation is disclosed in our earlier application published as WO2016/001659.

Substantially the full length of the DAS fibre or at least the full length of the DAS fibre used for sensing may be within the pipe. In other embodiments, the DAS fibre may include lengths within the pipe and lengths outside the pipe. In particular, the DAS fibre may lie within the pipe in unencumbered sections of the pipe and may exit and re-enter the pipe on either side of pipe machinery. In this context, pipe machinery may include, but is not limited to valves, pumps, junctions or the like as well as related building or land assets.

In some embodiments, the DAS fibre may be used to monitor multiple pipe segments. In such embodiments, the DAS fibre may be spliced to create a continuous link for sensing.

In some embodiments where DAS fibre leaves the pipe, the lengths of fibre outside the pipe may be utilised for monitoring activity outside the pipe. In one example, DAS fibre may exit the pipe at pipe machinery and lie buried around the pipe machinery before re-entering the pipe. In this manner, the buried section of the DAS fibre may be used for monitoring activity at or around the pipe machinery. In particular, this might include monitoring access to the pipe machinery, especially in the case of building or land assets, by detecting vehicles or individuals crossing the buried DAS fibre.

The light emitter may be a laser. The emitted light may any suitable wavelength for transmission along and backscattering within the DAS fibre. The light emitter and light detector may be integrated into a light transceiver unit.

Light emission may be controlled in order to vary any one or more of: pulse frequency, pulse length and pulse intensity of the emitted light. Detected backscattered light may be processed to determine vibration amplitudes and frequencies experienced by particular scattering points on the fibre and hence particular locations along the pipe. The method may include the step of filtering the received vibration signals. The filtering may be in respect of time of receipt (and hence location along the DAS fibre) or in respect of vibration frequency, vibration amplitude, or a combination thereof. In particular, the combination may include matching vibration frequency and amplitude against expected signatures of particular events. This can enable the method to be focussed on detecting or excluding particular sources of vibration. In one example, this could be orifice noise caused by fluid leaking from the pipe. In other examples, this could be pressure waves within the pipe or temperature variations within the pipe. In still further implementations, the processing unit may be operable to detect vibrations associated with activity outside the pipe. For instance, this may include the detection of traffic on roads overlying or close to a buried pipe.

The processing and/or filtering of detected light signals may be carried out by a processing unit. The processing unit may be in communication with the light detector. The processing unit may be in communication with the light emitter. In such embodiments, the processing unit may be operable to control the light emitter. The processing unit may be provided locally to the light detector and the light emitter.

In some embodiments, the light emitter, light detector and processor may be integrated into a pipe sensor unit. Such a sensor unit may be provided with a user interface. The user interface may enable a user to control operation of the pipe sensor unit and/or review indications relating to the condition of the monitored pipe.

The method may include the additional step of transmitting data along the DAS fibres. The data may be simplex data. The data may be transmitted in a non-contact fashion. In one embodiment, data may be encoded and transmitted by applying vibrations to the pipe, the fluid or to the DAS fibre. The vibrations may be applied by a vibrator unit. Preferably, the vibrator unit is directly coupled to the fibre. The applied vibrations may be encoded using a dual tone multiple frequency (DTMF) scheme. Such schemes provide a robust and reliable decoding of signals.

The vibrator unit may be connected to a processing device or to a sensor operable to sense the condition of the pipe, the condition of pipe machinery, or the presence of personnel. In the case of pipe machinery, this may include sensors monitoring the condition of physical access portals such as doors, gates, lids or the like. The encoded data may relate to the output of the processing device or sensor.

The method may include the additional step of sporadically transmitting a keep-alive signal from the vibrator unit. This can be used to verify continuing correct operation of the vibrator unit. This thereby helps overcome the limitations of simplex data transmission in such circumstances.

The method may include the additional steps of locating the route of an underground pipe. This may be achieved by successively tamping the ground surface at a number of locations in the vicinity of the suspect route of the pipe; processing the backscattered light so as to determine variations in the magnitude of vibrations due to the tamping at each location and thereby determining the route of the pipe.

The tamping may be carried out using any suitable tamping device, including both manual and powered devices. The method may include the step of filtering backscattered light to select vibrations at frequencies corresponding to those caused by the tamping or having acoustic signatures characteristic of tamping.

The tamping may be carried out at a series of regularly spaced locations along a line lying across the expected route of the pipe. In some implementations two or more parallel lines of tamping may be carried out. In some implementations, the tamping may be carried out at locations defined by a pre-set grid.

According to a third aspect of the present invention there is provided a method of locating the route of an underground pipe, the method comprising the steps of: providing a DAS fibre within the pipe; introducing coherent light pulses into the fibre; detecting backscattered light from the fibre; successively tamping the ground surface at a number of locations in the vicinity of the suspect route of the pipe; and processing the backscattered light so as to determine variations in the magnitude of vibrations due to the tamping at each location and thereby determining the route of the pipe.

The method of the third aspect of the present invention may incorporate any or all features of the first or second aspects of the present invention.

According to a fourth aspect of the present invention, there is provided a method of transmitting data along a pipe, the method comprising the steps of: providing a DAS fibre within the pipe; introducing coherent light pulses into the fibre; detecting backscattered light from the fibre; applying vibrations to the DAS fibre, the vibrations encoding data; processing the backscattered light so as to detect the applied vibrations.

According to a fifth aspect of the present invention, there is provided an apparatus for transmitting data along a pipe, the apparatus comprising: a distributed acoustic sensing (DAS) fibre provided within the pipe; a light emitter for introducing light pulses into the fibre; a light detector for detecting backscattering of the said light pulses; and a vibrator unit acoustically coupled to the DAS fibre, the vibrator unit operable to apply vibrations to the DAS fibre, the vibrations encoding data.

DETAILED DESCRIPTION OF THE INVENTION

In order that the invention may be more clearly understood one or more embodiments thereof will now be described, by way of example only, with reference to the accompanying drawings, of which:

Figure 1:
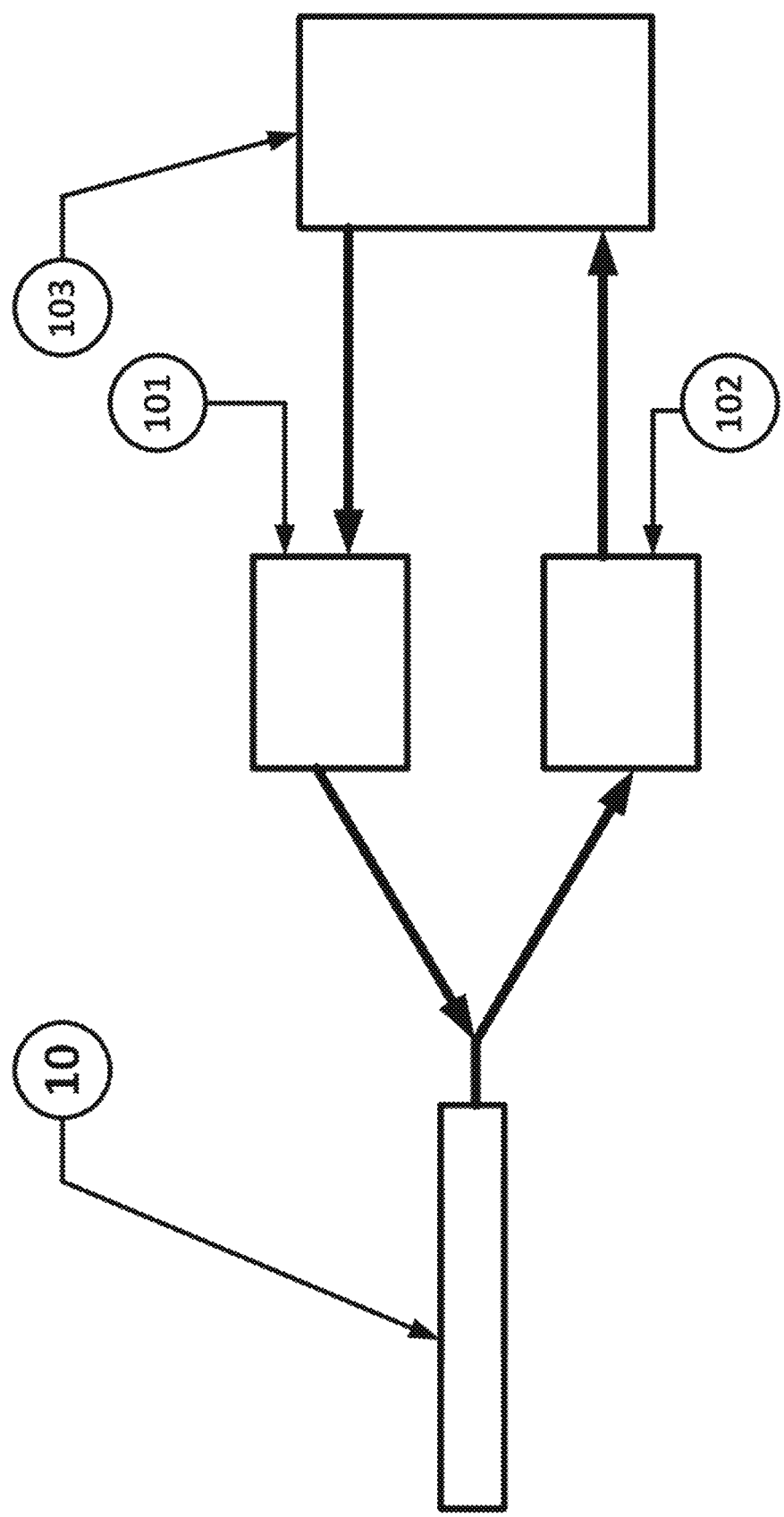
FIG. 1 is a schematic block diagram of a distributed acoustic sensing (DAS) apparatus.

Turning now to FIG. 1, a fluid pipe 1 is monitored using a distributed acoustic sensing (DAS) fibre 10. In the description below, the invention is primarily described in terms of monitoring of a pipe carrying water. Nevertheless, the skilled man will appreciate that the invention may be applied to pipes 1 carrying other fluids including, but not limited to, waste water, sewage or fuels such as oil, gas distillates or the like and chemical or mining products.

The DAS fibre is coupled at one end to a light emitter 101, typically a laser and a light detector 102. The light emitter 101 emits light pulses into the DAS fibre. The light detector 102 detects backscattered light from the DAS fibre, the time of arrival of the backscattered light following the emission of a pulse relating to the location of the backscattering site along the DAS fibre. Vibrations propagating through the fluid around the DAS fibre 10 result in corresponding vibration of the DAS fibre 10. Vibrations of the fibre cause variation in the backscattering that occurs from each backscattering site. Accordingly, these variations can be used to provide an indication of the vibration experienced by each section of the DAS fibre. A processing unit 103 may be provided to process the detected light and thereby provide an output indicative of vibrations imposed upon the DAS fibre 10 along its length. The processing unit 103 will typically be local to the light emitter 101 and light detector 102 but may be alternatively provided at a remote location. In the latter case, a communication unit (not shown) would be operable to communicate remotely with the processing unit 103.

The processing unit 103 may be operable to identify vibrations as being characteristic of particular pipe events. This may be achieved by determining the frequencies or amplitudes of vibrations or by filtering selected frequencies of vibration. Common pipe events that might be detected beyond orifice noise and negative pressure waves indicative of leaks include flow noise, pressure waves indicative of operation of pipe machinery (valves, pumps or the like) or the change of fluid temperature. Where sensitivity permits, events external to the pipe may also be detected and monitored.

Figure 2:
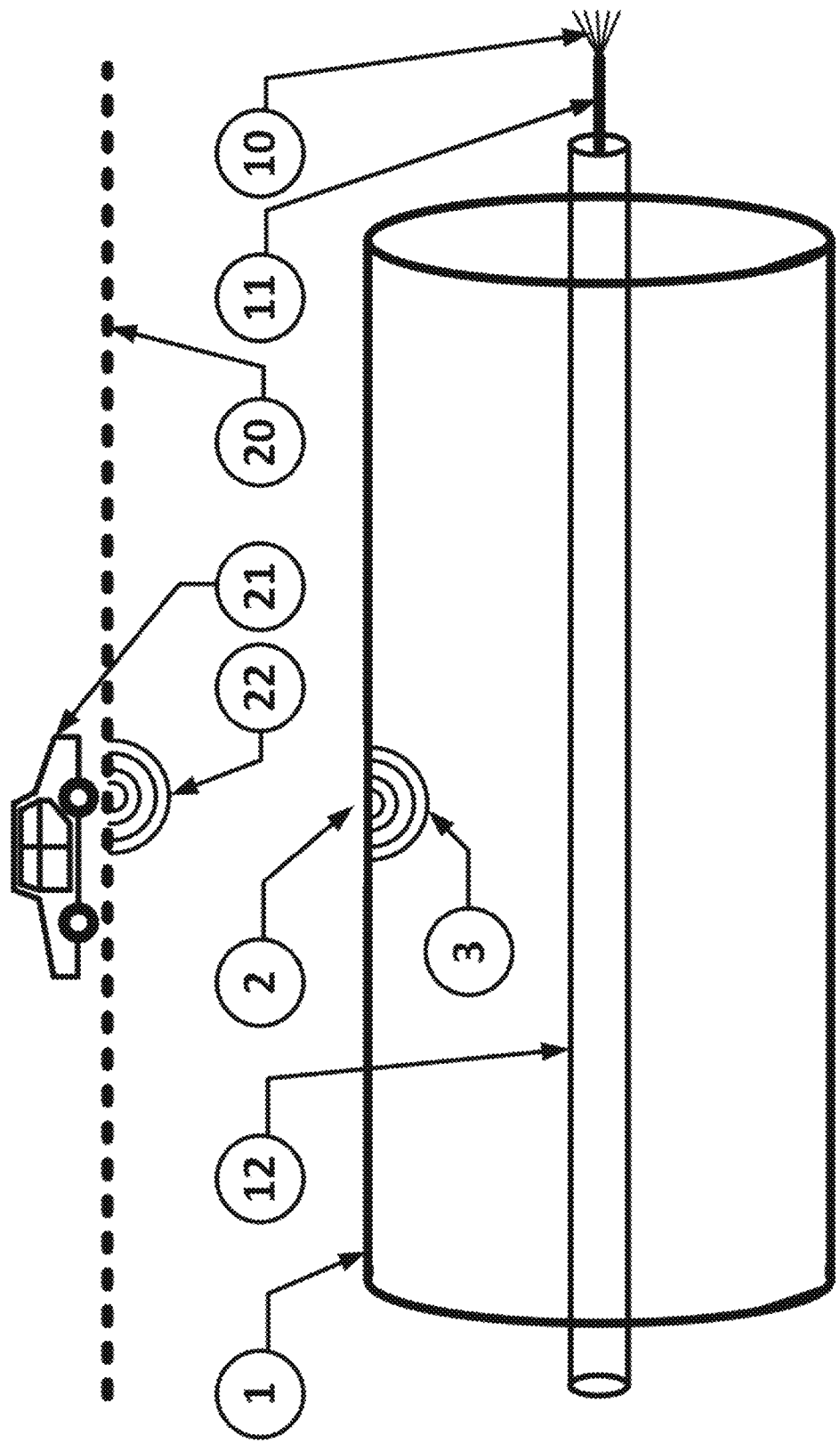
FIG. 2 is a schematic illustration of pipe monitoring using a DAS fibre according to the present invention.

Turning now to FIG. 2, the DAS fibre 10 is provided within pipe 1. In the event that the pipe 1 has a leak 2, vibrations 3 characteristic of orifice noise will travel through the fluid until they impinge on the DAS fibre 10. Subsequent operation of the processing unit will determine the occurrence of vibrations of the DAS fibre 10 and the position along the DAS fibre 10 at which these vibrations occur. Accordingly, the position of the leak 2 along the length of pipe 1 can also be determined.

As shown in FIG. 2, the pipe 1 runs under a road 20. Vehicles 21 travelling along the road 20 generate vibrations 22 which can travel though the ground to the pipe 1. The vibrations 22 can also be detected on DAS fibre 10. Accordingly, the DAS fibre 10 can be used to monitor traffic flow on road 20. In other situations, the DAS fibre 10 can be used to monitor other activity external to the pipe 1.

In the example shown, the DAS fibre 10 is a single dedicated fibre in a multicore cable 11 formed from a plurality of fibres. The multicore cable 11 may be provided with a protective exterior coating (not shown). Furthermore, in this example, the multicore cable 11 is provided within a microduct 12. The microduct 12 forms a barrier between the cable 11 and the fluid within pipe 1. In the description below, the invention will primarily be described in terms of dedicated DAS fibres 10 of multicore cables 11 provided within microducts 12. Nevertheless, the skilled man will appreciate that the invention may be applied to multicore cables 11 or single DAS fibres 10 (both either coated or uncoated) provided directly within pipes rather than within a microduct 12.

Figure 3:
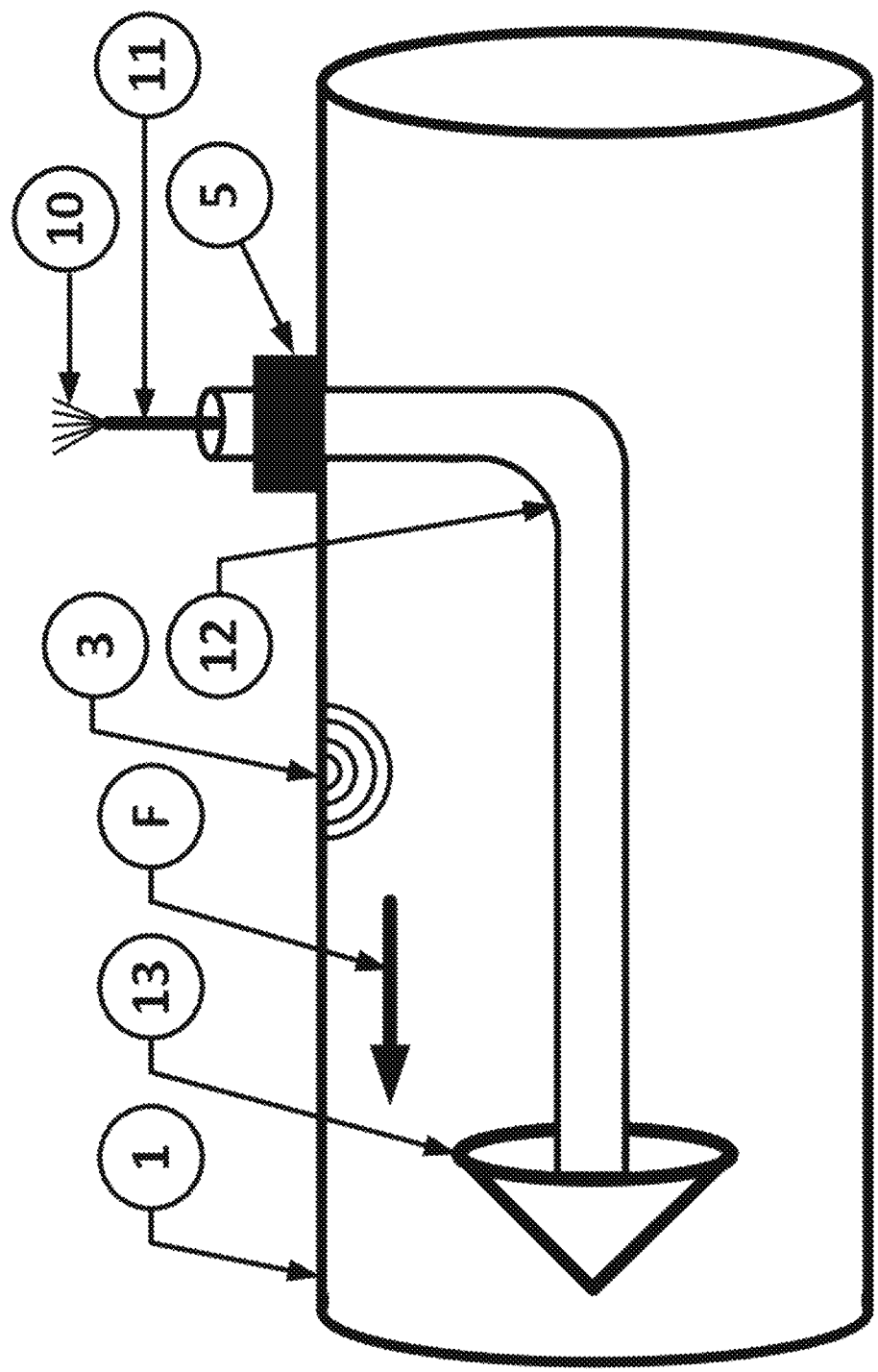
FIG. 3 is a schematic illustration of how a DAS cable may be introduced into a pipe in accordance with the present invention.
Figure 4:
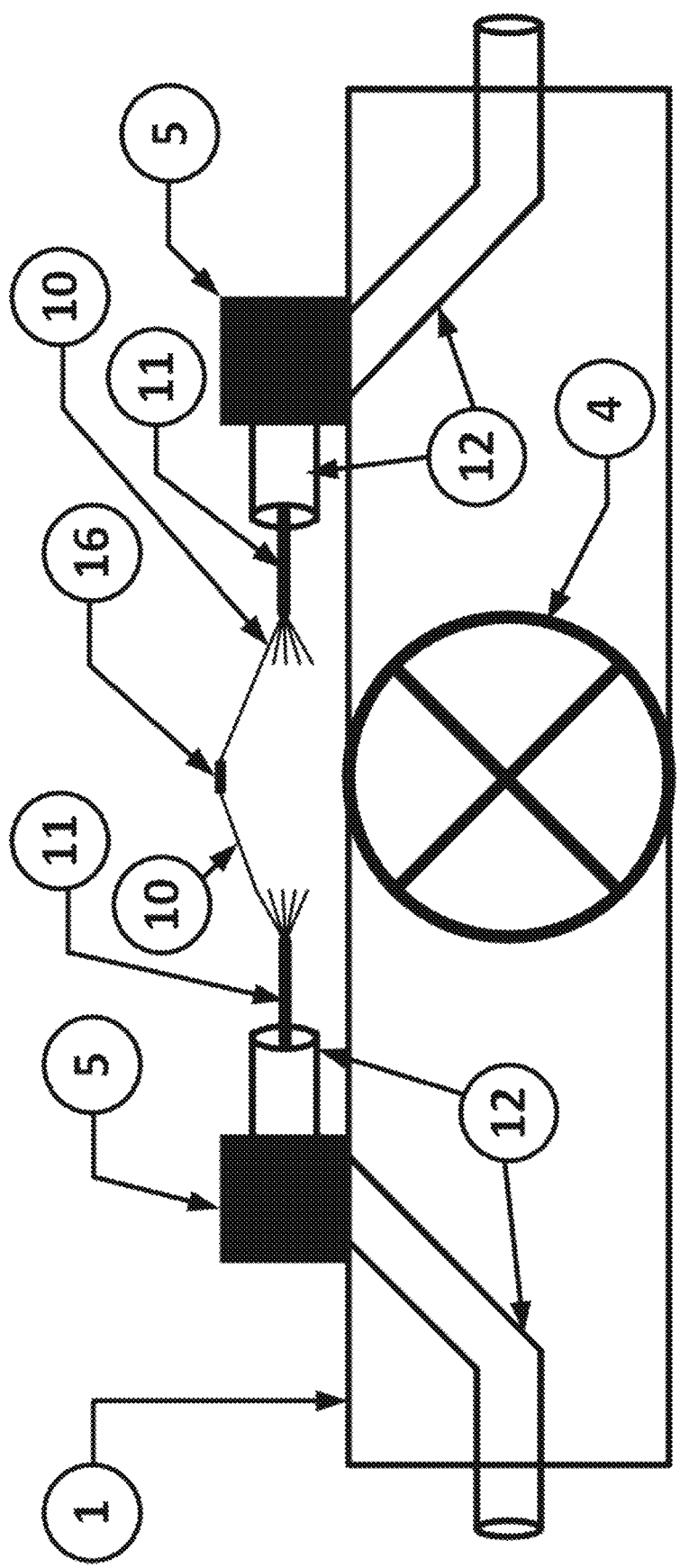
FIG. 4 is a schematic illustration of how according to the present invention a DAS cable may exit and re-enter a monitored pipe so as to avoid impacting on pipe machinery.

The DAS fibre 10 (or microduct 12, as appropriate) is introduced into the pipe 1 through an aperture (not shown) in the pipe wall. As shown in FIGS. 3 and 4, typically, this aperture will be provided with a suitable fitting 5 that provides a seal between the DAS fibre 10 (or the microduct 12) and the edges of the aperture. Such a fitting 5 can be installed whilst the pipe 1 is drained of fluid. Alternatively, the fitting 5 can enable the formation of an aperture and the subsequent introduction of a DAS fibre 10 (or a microduct 12) using so called 'hot tap' techniques known in the art that do not require the pipe 1 to be drained. Hot tap techniques are particularly suitable in instances where the DAS fibre 10 is installed temporarily, for instance to establish the location of a suspected leak. Non-limiting examples of fittings and techniques for introducing fibres and/or microducts to pipes are also disclosed in our prior patent applications WO2010/029365, WO2011/135383, WO2015/001332, WO2017/085466 and WO2017/081478.

After introduction, the DAS fibre 10 or microduct 12 is transported along the pipe 1. In some instances, the DAS fibre 10 or microduct 12 is pulled along by fluid flow F within the pipe 1. As is shown in FIG. 3, this may be aided by the provision of a sail structure 13 attached to the end of the DAS fibre 10 or microduct 12. Where the DAS fibre 10 or microduct 12 is introduced temporarily, the sail structure 13 may be collapsible. This can aid in subsequently withdrawing the DAS fibre 10 or microduct 12 through the fitting. In alternative embodiments, the DAS fibre 10 or microduct 12 is towed by a powered submersible introduced into the pipe 1.

In embodiments incorporating a microduct 12, following introduction of the microduct 12, the DAS fibre 10 is blown along the microduct 10. The microduct 12 may be filled with acoustic gel (not shown). This can improve acoustic coupling between the microduct 12 and the DAS fibre 10.

In the event that a pipe 1 to be monitored incorporates pipe machinery such as valves or pumps or associated buildings or land assets, the DAS fibre 10 may exit and re-enter the pipe 1 on either side of the machinery. An example of such a situation is shown in FIG. 4, where pipe 1 is fitted with an in-line stop valve 4. As shown, microduct 12 exits the cable on one side of the valve 4 via a fitting 5 providing a seal between the microduct 12 and the edges of an aperture in the pipe 1; and re-enters the pipe 1 on the other side of the valve 4 via a corresponding fitting 5. In such examples, the DAS fibre 10 may run continuously around the valve 4. Alternatively, such a bypass may provide a convenient point at which to provide a splice 16 connecting together different sections of DAS fibre 10.

Figure 5:
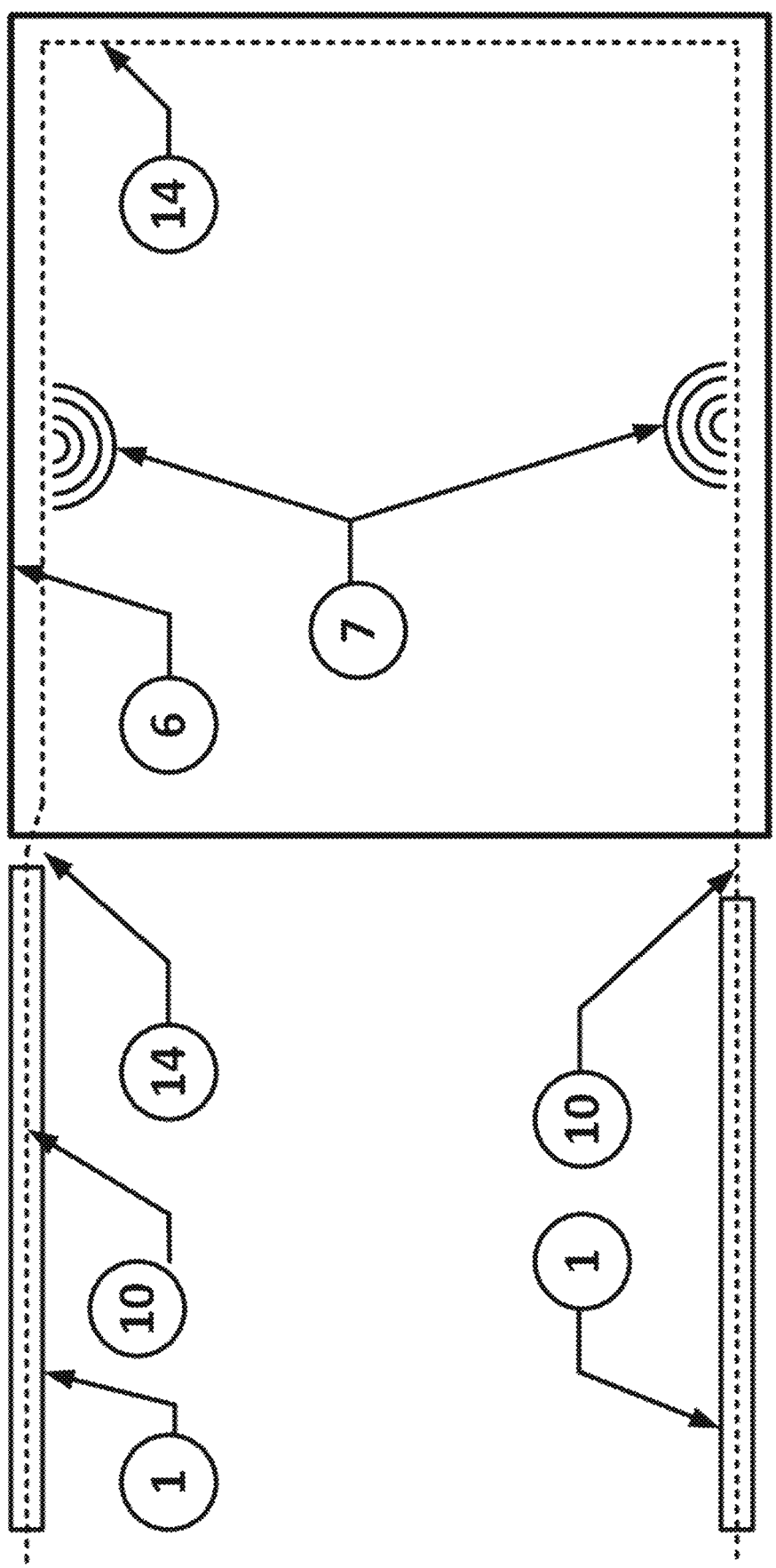
FIG. 5 is a schematic illustration of the use in the present invention of DAS fibre between exit from and re-entry to the pipe to monitor activity outside the monitored pipe.

In order to ensure monitoring is confined to the sections of DAS fibre 10 within the pipe 1, the processing unit 103 may be operable to disregard backscattered light where the time of detection indicates that it was backscattered from the section of DAS fibre 10 outside the pipe 1. In other embodiments, the processing unit 103 may be operable to separately process light backscattered from the section of DAS fibre 10 outside the pipe 1. This can allow separate monitoring of activity outside the pipe 1. In some examples, such as those shown in FIG. 5, an extended section 14 of DAS fibre 10 may be provided. The extended section 14 may be buried around the perimeter 6 of accessible pipe machinery comprising a building or land asset such as a pumping station or the like. Monitoring light backscattered from the extended section 14 can detect vibrations 7 characteristic of the crossing of perimeter 6 by persons or vehicles. This can enable unauthorised perimeter crossings, which may indicate unauthorised access, to be detected.

The position of the DAS fibre 10 (or microduct 12) within the pipe 1 may be varied as appropriate. In FIG. 2, the microduct 12 containing the DAS fibre 10 runs substantially along the centre of the pipe 1. This position is advantageous in that it equally exposed to leaks from all sides of the pipe 1. It is also relatively simple to allow DAS fibre 10 (or microduct 12) to assume this position within the fluid on introduction, via a neutral buoyancy. Accordingly, this positioning is convenient for temporary installations.

In some cases it may be desirable to position the DAS fibre 10 or microduct 12 in an alternative position such as close to a wall of the pipe 1. This can be achieved by the DAS fibre and/or microduct having positive or negative buoyancy, or by the use of suitable brackets or manifolds. Such positioning may be employed in order to minimise the effect of the DAS fibre 10 or microduct 12 on fluid flow or so as to ensure that the DAS fibre 10 or microduct 12 remains immersed in fluid, for instance in gravity fed systems. Additionally, this portion of the pipe 1 remains immersed in fluid in most conditions, thereby improving the acoustic coupling between the pipe and the DAS fibre 10 or microduct 12.

Figure 6:
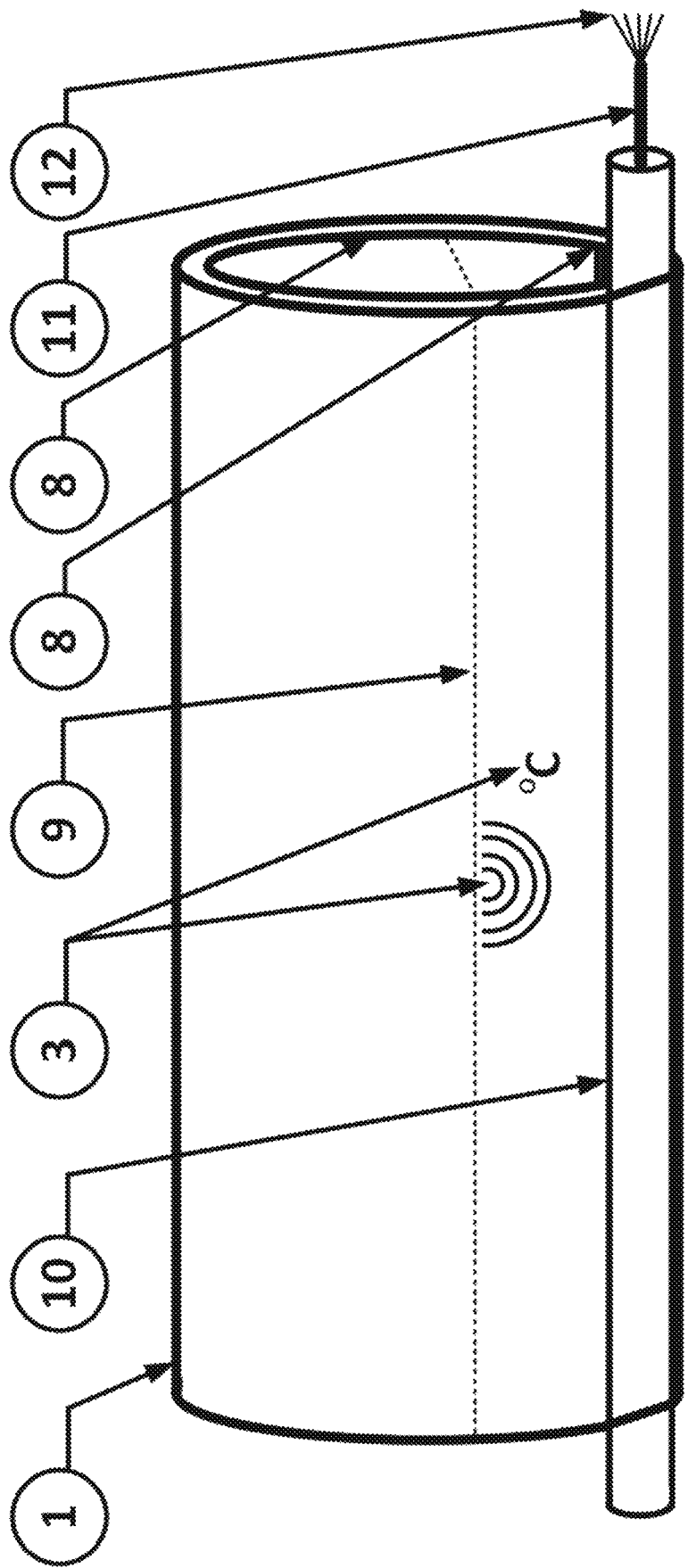
FIG. 6 is a schematic illustration of an alternative implementation of pipe monitoring using a DAS fibre according to the present invention wherein the pipe is provided with a liner having an integral microduct.

Turning now to FIG. 6, this illustrates an embodiment where the DAS fibre 10 is provided within a microduct 12 integrally formed between two layers of a pipe 1 or of a pipe liner 8 installed within the pipe 1. Pipe liners 8 of this type and methods for installing such pipe liners 8 are disclosed in our prior patent application WO2016/001659.

In the example of FIG. 6, the pipe liner 8 is orientated such that the integral microduct 12 is provided at the base of the pipe 1. Nevertheless, the skilled man will appreciate that alternative orientations of pipe liner 8 are possible.

FIG. 6 also illustrates the case of a pipe 1, such as a sewer, which is not always filled with fluid. In such instances, where there is a fluid level 9 partway up the pipe 1, better performance can be obtained by laying the DAS fibre 10 along the base of pipe 1 as vibrations 3 are more readily coupled to the DAS fibre in this position.

Figure 7:
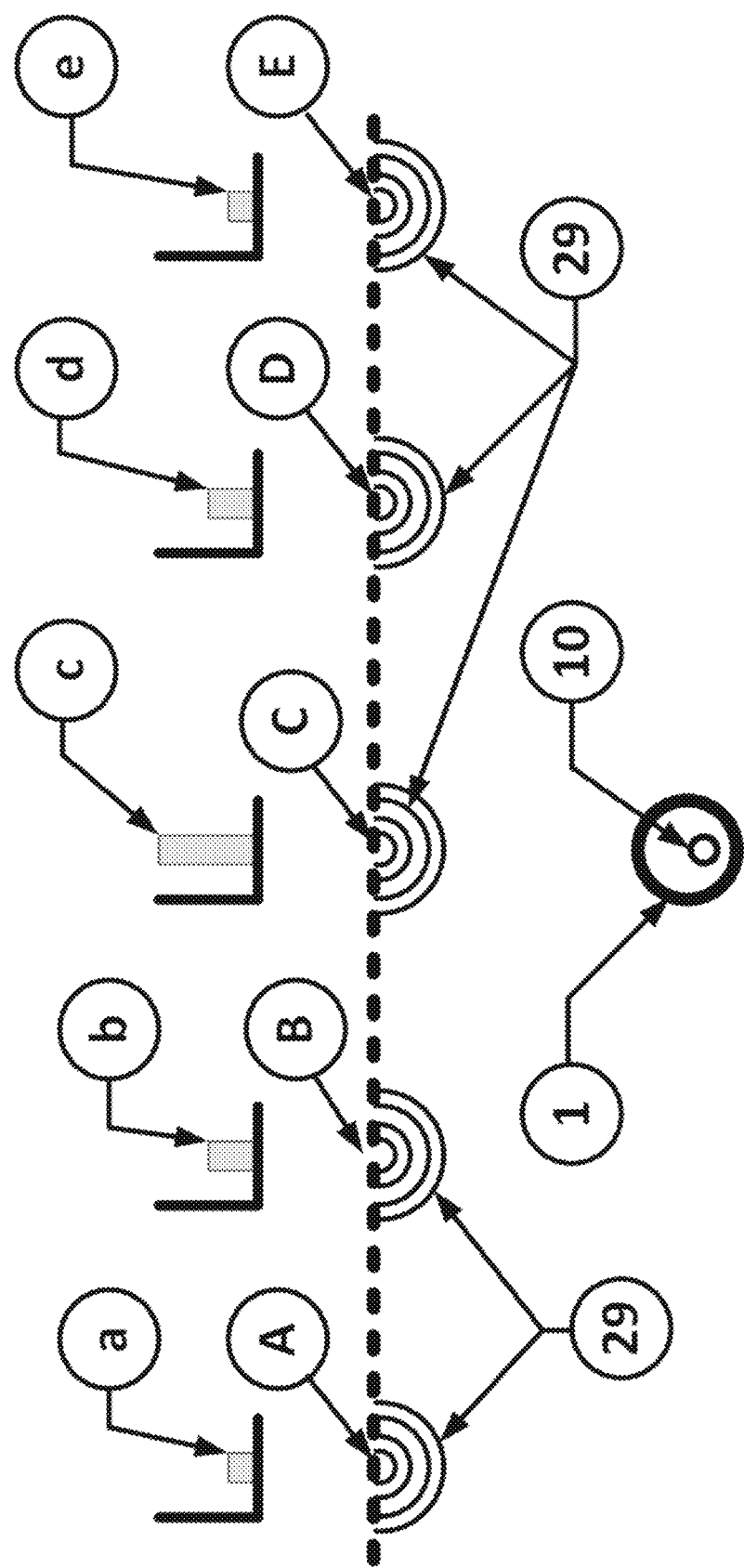
FIG. 7 is a schematic illustration of a method of locating a buried pipe according to the present invention.

Turning now to FIG. 7, this illustrates use of a DAS fibre 10 in a pipe 1 in order to locate the route of a buried pipe 1. This is achieved by successively tamping the ground surface at a number of locations A-E in the vicinity of the suspect route of the pipe 1. The tamping generates tamping vibrations 29. The tamping may be carried out by any suitable item, for example a manually operated or powered device.

The backscattered light associated with each tamping location A-E is processed so as to determine variations in the magnitude of tamping vibrations detected from each location A-E. The tamping is carried out at a series of regularly spaced locations A-E along a line lying across the expected route of the pipe. Comparing the tamping vibrations detected from each location A-E allows a determination of the route of the pipe 1 to be made.

As shown in vibration detection level graphs a-e of FIG. 7, tamping at locations A and E furthest from the route of pipe 1 results in the detection of relatively weak tamping vibrations 29. Tamping at locations B and D closer to the route of pipe 1 results in the detection of stronger tamping vibrations 29 and tamping at location C directly above the route of the pipe 1 results in the detection of the strongest tamping vibrations 29. To improve performance, the processing unit 103 may filter the output of the light detector 102 to preferentially select frequencies characteristic of tamping vibrations 29.

In instances where two tamping locations result in the detection of similar maximum strength tamping vibrations 29, it may be deduced that the route of the pipe 1 lies between these locations. If this does not provide sufficient clarity on the pipe 1 route, then additional tamping can be carried out at a series of additional locations between the two locations.

Where the extended route of a pipe 1 is to be determined, the tamping locations may be arranged in two or more rows or a grid over the suspected route of the pipe 1.

Figure 8:
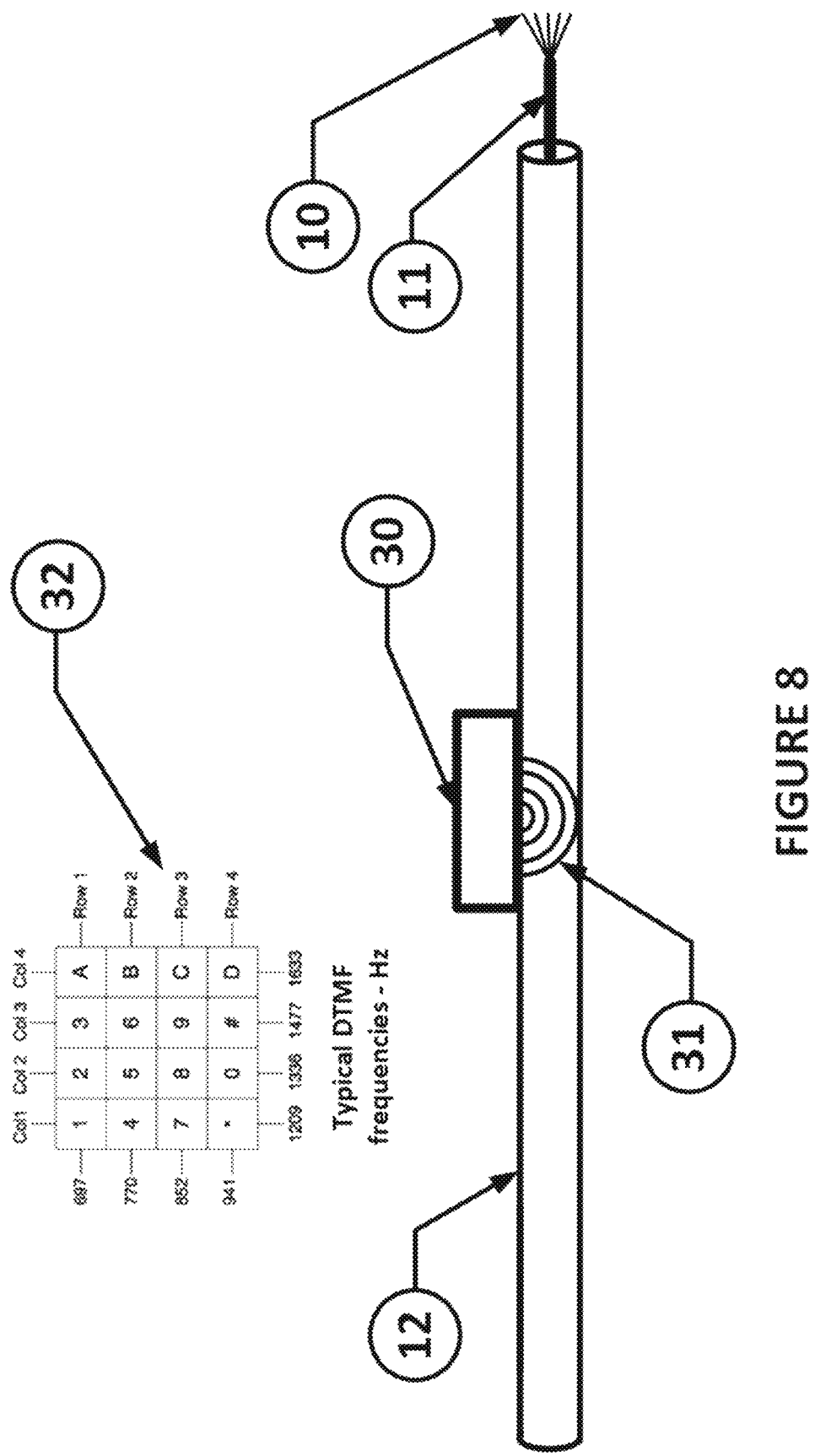
FIG. 8 is a schematic illustration of the use of a DAS cable for transmitting data along a pipe in accordance with the present invention.

Turning now to FIG. 8, this illustrates to use of a DAS fibre 10 within a pipe 1 for the simplex transmission of data. In this example, a vibrator unit 30 is coupled to the DAS fibre 10 via microduct 12. The vibrator unit 30 may be connected to a processing device or to a sensor (not shown) operable to sense the condition of the pipe 1, the condition of pipe machinery, or to identify the presence of personnel working on a section of pipe, pipe machinery or within an asset. The vibrator unit 30 is operable to receive data from the processing device or sensor and encode the data into vibrations 31 applied to the DAS fibre. As shown in table 32 in FIG. 8, the vibrator unit 30 may encode data using a dual tome multi-frequency (DTMF) scheme to provide robust and reliable communications. To overcome the limitations of simplex data transmission, a keep-alive signal may optionally be broadcast from each vibrator unit 30, on a sporadic basis, to verify continuing correct operation of the vibrator unit 30.

The applied vibrations 31 cause variation in the backscattering of light along the cable. These variations can be detected by light detector 102. The processing unit 103 can subsequently identify and decode such vibrations 31 within the frequency domain to enable the output or onward communication of said data. For instance, the example illustrated in FIG. 8 enables the transmission of data comprising character sets of up to 16 characters.

The above embodiments are described by way of example only. Many variations are possible without departing from the scope of the invention as defined in the appended claims.

The invention claimed is:

1. A method of monitoring a fluid pipe, the method comprising the steps of: providing a distributed acoustic sensing (DAS) fibre within the pipe; introducing coherent light pulses into the DAS fibre; detecting backscattered light from the DAS fibre; and processing the backscattered light so as to obtain information about condition of the pipe; wherein a barrier is provided between the DAS fibre and fluid in the pipe, wherein the barrier is in contact with fluid, and wherein the DAS fibre includes lengths within the pipe and lengths outside the pipe and optionally wherein the lengths of fibre outside the pipe are utilised for monitoring activity outside the pipe.

2. A method as claimed in claim 1 wherein the DAS fibre is a single fibre or a dedicated fibre within a bundle of fibres.

3. A method as claimed in claim 1 including the additional steps of installing a pipe liner incorporating a barrier in the form of an integral microduct in the pipe and blowing the DAS fibre along the integrated integral microduct.

4. A method as claimed in claim 1 wherein the barrier comprises a microduct within which the DAS fibre is provided.

5. A method as claimed in claim 4 wherein the method includes the step of introducing the microduct to the pipe and subsequently blowing the DAS fibre along the microduct.

6. A method as claimed in claim 4 including the step of introducing a gel between the DAS fibre and the barrier.

7. A method as claimed in claim 6 wherein the gel comprises an acoustic gel for improving acoustic coupling between the DAS fibre and the barrier.

8. A method as claimed in claim 1 wherein the introduced light is controlled in order to vary any one or more of: pulse frequency, pulse length and pulse intensity of the introduced light.

9. A method as claimed in claim 1 wherein detected backscattered light is processed to determine vibration amplitudes and frequencies experienced by particular scattering points on the DAS fibre and hence particular locations along the pipe optionally wherein processing includes filtering received vibration signals in respect of time of receipt or in respect of vibration frequency, vibration amplitude, or a combination thereof.

10. A method as claimed in claim 1 including the additional step of transmitting data along the DAS fibre, by applying vibrations, using a vibrator unit, to the pipe, the fluid or to the DAS fibre.

11. A method as claimed in claim 10 wherein the method includes the additional step of sporadically transmitting a keep-alive signal from the vibrator unit.

12. A method as claimed in claim 1 including locating a route of an underground pipe by: successively tamping a ground surface at a number of locations in vicinity of a suspect route of the pipe; processing the backscattered light so as to determine variations in magnitude of vibrations due to the tamping at each location and thereby determining the route of the pipe.

13. An apparatus for monitoring a pipe, the apparatus comprising: a distributed acoustic sensing (DAS) fibre provided within the pipe; a barrier provided between the DAS fibre and fluid in the pipe, the barrier being in contact with the fluid; a light emitter for introducing light pulses into the DAS fibre; and a light detector for detecting backscattering of the said light pulses, wherein the DAS fibre includes lengths within the pipe and lengths outside the pipe, and optionally wherein the lengths of the fibre outside the pipe are utilised for monitoring activity outside the pipe.

14. An apparatus as claimed in claim 13 wherein the DAS fibre is a single fibre or a dedicated fibre within a bundle of fibres.

15. An apparatus as claimed in claim 13 wherein the barrier comprises a microduct within which the DAS fibre is provided.

16. An apparatus as claimed in claim 13 wherein a gap between the DAS fibre and the barrier is filled with gel, wherein the gel comprises an acoustic gel for improving acoustic coupling between the DAS fibre and the barrier.

17. An apparatus as claimed in claim 13 wherein the DAS fibre runs within a barrier in the form of a microduct integrally formed within a pipe liner installed in the pipe.

18. An apparatus as claimed in claim 13 wherein a vibrator unit is provided operable to transmit data along the DAS fibre, by applying vibrations to the pipe, to the fluid or to the DAS fibre, optionally wherein the vibrator unit is connected to a processing device or to a sensor operable to sense condition of the pipe, condition of the pipe machinery, or presence of personnel.

19. A method of monitoring a fluid pipe, the method comprising the steps of: providing a distributed acoustic sensing (DAS) fibre within the pipe; introducing coherent light pulses into the DAS fibre; detecting backscattered light from the DAS fibre; processing the backscattered light so as to obtain information about condition of the pipe, wherein a barrier is provided between the DAS fibre and fluid in the pipe, and wherein the barrier is in contact with the fluid; and transmitting data along the DAS fibre, by applying vibrations, using a vibrator unit, to the pipe, the fluid or to the DAS fibre.

20. A method as claimed in claim 19 wherein the DAS fibre is a single fibre or a dedicated fibre within a bundle of fibres.

21. A method as claimed in claim 19 wherein the barrier comprises a microduct within which the DAS fibre is provided.

22. A method as claimed in claim 21 wherein the method includes the step of introducing the microduct to the pipe and subsequently blowing the DAS fibre along the microduct.

23. A method as claimed in claim 19 including the additional steps of installing a pipe liner incorporating a barrier in the form of an integral microduct in the pipe and blowing the DAS fibre along the integral microduct.

24. A method as claimed in claim 21 including the step of introducing a gel between the DAS fibre and the barrier.

25. A method as claimed in claim 24 wherein the gel comprises an acoustic gel for improving acoustic coupling between the DAS fibre and the barrier.

26. A method as claimed in claim 19 wherein the introduced light is controlled in order to vary any one or more of: pulse frequency, pulse length and pulse intensity of the introduced light.

27. A method as claimed in claim 19 wherein detected backscattered light is processed to determine vibration amplitudes and frequencies experienced by particular scattering points on the DAS fibre and hence particular locations along the pipe optionally wherein processing includes filtering received vibration signals in respect of time of receipt or in respect of vibration frequency, vibration amplitude, or a combination thereof.

28. A method as claimed in claim 19 wherein the method includes the additional step of sporadically transmitting a keep-alive signal from the vibrator unit.

29. A method as claimed in claim 19 including locating a route of an underground pipe by: successively tamping a ground surface at a number of locations in vicinity of a suspect route of the pipe; processing the backscattered light so as to determine variations in magnitude of vibrations due to the tamping at each location and thereby determining the route of the pipe.

30. An apparatus for monitoring a pipe, the apparatus comprising: a distributed acoustic sensing (DAS) fibre provided within the pipe; a barrier provided between the DAS fibre and fluid in the pipe, the barrier being in contact with the fluid; a light emitter for introducing light pulses into the DAS fibre; a light detector for detecting backscattering of the said light pulses; and a vibrator unit is provided operable to transmit data along the DAS fibre, by applying vibrations to the pipe, to the fluid or to the DAS fibre, optionally wherein the vibrator unit is connected to a processing device or to a sensor operable to sense condition of the pipe, condition of the pipe machinery or presence of personnel.

31. An apparatus as claimed in claim 30 wherein the DAS fibre is a single fibre or a dedicated fibre within a bundle of fibres.

32. An apparatus as claimed in claim 30 wherein the barrier comprises a microduct within which the DAS fibre is provided.

33. An apparatus as claimed in claim 30 wherein a gap between the DAS fibre and the barrier is filled with gel, wherein the gel comprises an acoustic gel for improving acoustic coupling between the DAS fibre and the barrier.

34. An apparatus as claimed in claim 30 wherein the DAS fibre runs within a barrier in the form of a microduct integrally formed within a pipe liner installed in the pipe.

\* \* \* \* \*